United States Patent [19]
Hellberg et al.

[11] 3,821,321
[45] June 28, 1974

[54] PROCESS FOR THE PREPARATION OF PENTAFLUOR OMONOIODOETHANE

[75] Inventors: Karl-Heinz Hellberg, Hannover; Werner Rudolph, Anderten/Han; Joachim Massonne, Hannover, all of Germany

[73] Assignee: Kali-Chemie Aktiengesellschaft, Hannover, Germany

[22] Filed: July 7, 1971

[21] Appl. No.: 165,850

[30] Foreign Application Priority Data
July 8, 1970 Germany............................ 2033755

[52] U.S. Cl. ............................................. 260/653
[51] Int. Cl. ............................................ C07c 19/08
[58] Field of Search ............................... 260/653 R

[56] References Cited
UNITED STATES PATENTS
3,006,973  10/1961  Hauptschein et al. ............. 260/653
3,132,185  5/1964  Parsons .............................. 260/653
3,406,214  10/1968  Blochl ................................ 260/653

*Primary Examiner*—Leon Zitver
*Assistant Examiner*—Joseph A. Boska
*Attorney, Agent, or Firm*—Michael S. Striker

[57] ABSTRACT

Improved process for preparing pentafluoromonoiodoethane by reaction of tetrafluoroethylene with iodinepentafluoride and iodine in the presence of a metal halide as the catalyst, in a sealed reactor at 0°–120°C and wherein the tetrafluoroethylene, iodinepentafluoride and iodine are used in a mol ratio of at least 5:1:2, the improvement comprising carrying out the reaction in the presence of a halide of a metal of the IV or V SUB-group of the periodic system or of a mixture of such metal halides at a temperature between 20° and 100°C.

This invention relates to an improved process for preparing pentafluoromonoiodoethane.

10 Claims, No Drawings

PROCESS FOR THE PREPARATION OF PENTAFLUOROMONOIODOETHANE

BACKGROUND OF THE INVENTION

Pentafluoromonoiodoethane which is also known as pentafluoroethyl iodide and perfluoroethyl iodide; is recognized as a valuable starting material for use in the preparation of telomeric perfluoroalkyliodides of higher molecular weights. The type of telomer thus produced can be used as an intermediate in the preparation of oleophobic-, hydrophobic and soil-releasing agents.

It is already known that pentafluoromonoiodoethane can be prepared by reacting tetrafluoro-1,2-diiodoethane with a fluorinating agent. Utilizing this procedure, pentafluoromonoiodoethane can be prepared for example by reacting tetrafluoro-1,2-diiodoethane with HF and HgO (U.S. Pat. No. 3,133,125). In accordance with a process described in DAS 1,568,018, tetrafluorodiiodoethane is reacted with $SbF_3Cl_2$ to form pentafluoromonoiodoethane. Further a process has been described in which $IF_5$ is used as the fluorinating agent (Emeleus, J. Chem. Soc. 1949, p. 2948).

The aforesaid processes all are associated with the disadvantage that they require the use of a relatively difficulty obtainable and additionally expensive starting material, namely tetrafluoro-1,2-diiodoethane. Additionally, the pentafluoromonoiodoethane is not obtained in satisfactory yields. Therefore, the aforesaid processes are not suitable for economic reasons.

Pentafluoromonoiodoethane has theretofore also been prepared by reacting tetrafluoroethylene with iodine and iodine pentafluoride. However, the yields of desired product are very small. An improvement in the yields is realized when the reaction is carried out in the presence of a catalyst. In accordance with the disclosure of DAS 1,292,641, the reaction of tetrafluoroethylene with iodinepentafluoride and iodine is carried out in a sealed reactor at a temperature of 0°–120°C wherein the tetrafluoroethylene, iodinepentafluoride and iodine are used in a mol ratio of at least 5:1:2 and wherein the reaction is carried out in the presence of antimonypentafluoride as catalyst. There is realized in accordance with this process an improved yield. While the yields are improved, the process, however, has not proved acceptable because the catalysts are very expensive and furthermore have a tendency to decomposition.

In DAS 1,292,641, another series of catalysts is disclosed for use in the same reaction, the series including $CaF_2$, $CrF_3 \cdot 3H_2O$, HF, KF, $CoF_2 \cdot 2H_2O$, $PbF_4$, $CuF_2$, and $NiF_2 \cdot 5H_2O$ which are more economical to use. However, the pentafluoromonoiodoethane is recovered in reduced yields so that their use is not technically advantageous.

SUMMARY OF THE INVENTION

In accordance with the invention a process is now provided for preparing pentafluoromonoiodoethane which constitutes a marked improvement over the known processes. The invention is directed to an improvement of the reaction of tetrafluoroethylene with iodinepentafluoride and iodine in the presence of a metal halide as catalyst, in a sealed vessel at 0°–120°C wherein the tetrafluoroethylene, iodinepentafluoride and iodine are used in a mol ratio of at least 5:1:2, the improvement comprising carrying out the reaction in the presence of a halide of a metal of the IV and V sub-groups of the Periodic System (Mendelejeff) or a mixture of these halides at a temperature of 20°–100°C.

In accordance with the invention, as metal halide of the IV and V sub-groups of the periodic system, there are suitable, for instance, the halides of titanium, zirconium and vanadium. As the halogen moiety of the metal halides there can be used iodides, bromides and preferably the chlorides and fluorides of the metals. The catalysts are used in very small amounts and namely in amounts of between 0.1 and 10 wt.-percent and preferably between 2 and 5 wt.-percent calculated on the charged iodinepentafluoride. A consumption of the catalyst in the reaction substantially does not take place.

In many cases, for example, it is advantageous to use an autoclave that is provided with a magnetic stirrer and with arched bottom plates in which autoclave a bottom layer of inert solid materials is introduced which acts to inhibit the tamping of the iodine during the reaction. Suitable materials for this purpose are for example aluminum trifluoride or highly calcined aluminum oxide.

The use of the catalyst in accordance with the invention permits the recovery of high yields of the desired reaction product and also high reaction velocities. These catalysts are relatively inexpensive and in addition are easily handled. They further have the advantage that they constitute very stable materials. They can as a result be reused a large number of times without their reactivity decreasing and without the yield of pentafluoromonoiodoethane being decreased. The process in accordance with the invention has the additional advantage that substantially no by-products are formed so that a purification of the reaction product is not necessary.

A particularly advantageous manner of carrying out the reaction is to introduce into the reaction vessel at the beginning of the reaction a solvent, inert with respect to the reactants. By the use of such a solvent it is possible to control to an improved degree the reaction temperature. Furthermore, the reaction when carried out in the liquid phase is carried out at a greater reaction velocity and with a homogeneous reaction course. Instances of solvents which can for example be used in this manner include perfluorinated hydrocarbons. Particularly advantageous is the use of pentafluoromonoiodoethane as solvent as in this case a later separation of the solvent can be avoided.

The process in accordance with the invention is carried out by introducing iodine, iodinepentafluoride and the catalyst into a pressure vessel constructed of steel, which is plated with "Hastelloy C" for reducing corrosion and which is provided with a stirrer and dip tube. The tetrafluoroethylene is introduced into this reactor continuously. The vessel is provided with a cooling device for carrying off heat. The velocity of the introduction of the tetrafluoroethylene is chiefly dependent on the strongly exothermic nature of the reaction and specifically on the manner by which reaction heat is removed from the system. The addition of the tetrafluoroethylene can likewise take place in increments. The end of the reaction is noticed by a decrease in the temperature and by an increase in the pressure. The reaction temperature is preferably maintained at from 20° to 100°C, and most preferably at a temperature between 60° and 80°C. Temperatures below 20°C are not recommended as at such low temperatures the reaction velocity is too low. Temperatures above 100°C are likewise unsuitable as a number of side products, for instance hexafluoroethane and tetrafluoro-1,2-diiodoethane are thereby formed. Additionally, there results under high temperature some decomposition of the formed pentafluoromonoiodoethane.

The pentafluoromonoiodoethane prepared in accordance with the invention can be removed from the reaction in gaseous or liquid form. The purification can be carried out according to the conventional procedures. Thus, for example the pentafluoromonoiodoethane can be removed from the reactor in gaseous form and thereafter passed through a sodium lime tower which serves to absorb the small amounts of HF and iodine present. The gaseous pentafluoromonoiodoethane is then passed through a calcium chloride drying tower and into a condenser where it is liquified. The thusly recovered product is colorless and has a purity degree of about 99 percent. The yield of pentafluoromonoiodoethane calculated on the charged iodinepentafluoride, iodine and tetrafluoroethylene is almost quantitative.

DETAILED DESCRIPTION

The following examples are given in order to more fully illustrate the invention and are not in any way to be construed as limitative thereof.

EXAMPLE 1

There were introduced into a 5 l blade stirrer autoclave 2032 g (8 mol) iodine, 888 g (4 mol) iodinepentafluoride and 60 g (0.34 mol) titanium tetrachloride at room temperature. Thereafter the autoclave was cooled down to 0°C and evacuated. The autoclave was then heated up to 40°C and gaseous tetrafluoroethylene continuously introduced through a dip tube at a rate of 200–250 l/hr. The exothermically formed reaction heat was carried off by external cooling so that a temperature in the range of 70°–80°C was maintained in the reactor. A total of 570 l of a 92 vol.-percent tetrafluoroethylene was introduced whereby a maximal pressure of about 34 atm at 80°C was established (the high pressure was conditioned through the 8 percent inert gas portion of the tetrafluoroethylene charge). After cooling the autoclave to 15°C a pressure of 20 atm was established. The reaction product was thereafter blown off and conducted through a sodium lime tower and a calcium chloride drying tower and introduced into a condenser where it was liquified at −50°C. The uncondensed portions were, following passage through the condenser, taken off and analyzed. These consisted in the main of the inert gaseous material and tetrafluoroethylene.

The yield of perfluoromonoiodoethane calculated on the charged iodinepentafluoride amounted to 95.6 percent, so that the conversion of tetrafluoroethylene was practically quantitative. There were thusly recovered colorless pentafluoromonoiodoethane whose purity amounted to 99 percent. The yield calculated on iodinepentafluoride was not guantitive for the reason that a portion of the iodinepentafluoride reacted with the catalyst to form titanium tetrafluoride. This loss, however, is only a one-time loss as the catalyst is reusable.

EXAMPLE 2

Using the autoclave described in Example 1, there were introduced therein 2,023 g (8 mol) iodine and 888 g (4 mol) iodinepentafluoroide. The catalyst had been left in the autoclave from the last reaction and was reused in the instant reaction. The reaction and the further working up of the reaction product was carried out as described in Example 1. In total there were introduced 570 l of a 94 vol.-percent tetrafluoroethylene into the autoclave. The yield of pentafluoromonoiodoethane amounted to 99.8 percent calculated on the charged iodopentafluoride and iodine. The same catalyst was used in eight further runs without any fall-off in its activity. In all runs substantially quantitative conversion of tetrafluoroethylene was obtained and pentafluoromonoiodoethane yields of substantially 100 percent calculated on the charged $IF_5$ were realized. Advantageously, there is allowed to remain in the autoclave sufficient pentafluoromonoiodoethane so that in the subsequent run the catalyst is in the form of a suspension.

EXAMPLE 3

There were introduced into a 1 liter autoclave (equipped with a magnetic lift stirrer) whose base had been filled with 50 g aluminum trifluoride in order to lessen the tamping of the iodine. 508 g (2 mol) iodine and 222 g (1 mol) iodinepentafluoride were introduced into this autoclave. As catalyst there were introduced into the reaction mixture 22.9 g (0.14 mol) zirconium-IV-chloride and 30 g (0.14 mol) iodinepentafluoride dissolved in 200 g pentafluoromonoiodoethane. Thereafter, under stirring, 139 l of a 93 vol.-percent tetrafluoroethylene were charged thereinto. The reaction temperature was maintained at 0°–80°C. After the end of the tetrafluoroethylene addition a maximum pressure of 28 atm (70°C) or 19 atm (24°C) was reached. The working up was carried out according to Example 1. At a conversion of the tetrafluoroethylene amounting to 98 percent, a yield of 1,406 g of pentafluoromonoiodoethane was obtained. This corresponds to a 98 percent yield calculated on the charged iodinepentafluoride and iodine.

EXAMPLE 4

There were introduced into a 1 liter autoclave provided with a magnetic lift stirrer and which had a bottom filled with 50 g aluminum trifluoride, 508 g (2 mol) iodine and 22 g (1 mol) iodinepentafluoride. There were also introduced into this mixture 20 g vanadium pentafluoride (0.14 mol) as catalyst in the form of a solution in 240 g pentafluoromonoiodoethane. Thereafter, 140 l of a 92 vol.-percent tetrafluoroethylene were introduced into the autoclave. The reaction temperature rose to 76°–82°C and was maintained at this level. After completion of the reaction the pressure amounted to 26 atm at 76°C. With a substantially quantitative conversion of the tetrafluoroethylene the yield of pentafluoromonoiodoethane calculated on the charged iodinepentafluoride and iodine amounted to 99.5 percent.

EXAMPLE 5

The procedure of Example 4 was repeated, but with aluminum trifluoride used as a bottom filling and vanadium pentafluoride from the preceding run was again used as the catalyst. 508 g iodine (2 mol), 222 g iodinepentafluoride (1 mol), and 200 g pentafluoromonoiodoethane were introduced into the autoclave. Thereafter, 130 (5.2 mol) of a 99.6 vol.-percent tetrafluoroethylene was charged thereinto. At a reaction temperature of 65°C, a pressure having a maximum value of 12 atm was reached. Following completion of the reaction and cooling down to room temperature the pressure amounted to 5 atm. The working up was carried out as described in Example 1. There were blown off 4 l of unreacted tetrafluoroethylene. The yield of pentafluoromonoiodoethane amounted to 99.9 percent calculated on the charged iodinepentafluoride and reacted tetrafluoroethylene.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the preparation of pentafluoromonoiodoethane comprising the step of reacting tetrafluoroethylene with iodine pentafluoride and iodine in a closed reactor at a temperature between 20° and 100°C in which the molecular ratio of tetrafluoroethylene to iodine pentafluoride is 5:1 and the molecular ratio of iodine pentafluoride to iodine is 1:2 in the presence of a halide or mixture of halides of a metal or metals of the group consisting of titanium, zirconium, and vanadium.

2. Process according to claim 1, wherein said metal halide is a chloride or fluoride.

3. Process according to claim 1, wherein said metal halide is used in an amount of between 0.1 and 10 wt.-percent based on the weight of the iodine pentafluoride.

4. Process according to claim 1, wherein said metal halide is used in an amount between 2–5 wt.-percent based on the weight of the iodine pentafluoride.

5. Process according to claim 1, wherein said reaction is carried out at a temperature between 60° and 80°C.

6. Process according to claim 1, wherein said reaction is carried out in the presence of an inert solvent introduced at the beginning of the reaction.

7. Process according to claim 6, wherein said solvent is pentafluoromonoiodoethane.

8. Process according to claim 1, wherein said metal halide is titanium tetrachloride.

9. Process according to claim 1, wherein said metal halide is zirconium IV chloride.

10. Process according to claim 1, wherein said metal halide is vanadium pentafluoride.

* * * * *